(12) United States Patent
Kuramitsu et al.

(10) Patent No.: US 11,767,958 B2
(45) Date of Patent: Sep. 26, 2023

(54) VEHICLE LIGHTING DEVICE

(71) Applicant: TOYODA GOSEI CO., LTD., Kiyosu (JP)

(72) Inventors: Yuhki Kuramitsu, Kiyosu (JP); Yoshiharu Tanaka, Kiyosu (JP); Hirotaka Fukui, Kiyosu (JP); Masaya Kometani, Kiyosu (JP); Makoto Okada, Kiyosu (JP); Hiroyuki Harai, Ama (JP)

(73) Assignee: TOYODA GOSEI CO., LTD., Kiyosu (JP)

( * ) Notice: Subject to any disclaimer, the term of this patent is extended or adjusted under 35 U.S.C. 154(b) by 45 days.

(21) Appl. No.: 17/636,237

(22) PCT Filed: May 21, 2020

(86) PCT No.: PCT/JP2020/020078
§ 371 (c)(1),
(2) Date: Feb. 17, 2022

(87) PCT Pub. No.: WO2021/033381
PCT Pub. Date: Feb. 25, 2021

(65) Prior Publication Data
US 2022/0333754 A1    Oct. 20, 2022

(30) Foreign Application Priority Data
Aug. 20, 2019  (JP) ................ 2019-150736

(51) Int. Cl.
*F21S 41/25* (2018.01)
*F21S 41/43* (2018.01)
*F21S 45/70* (2018.01)

(52) U.S. Cl.
CPC .............. *F21S 41/25* (2018.01); *F21S 41/43* (2018.01); *F21S 45/70* (2018.01)

(58) Field of Classification Search
None
See application file for complete search history.

(56) References Cited

U.S. PATENT DOCUMENTS

| 2016/0097507 A1* | 4/2016 | Ovenshire ............... F21S 43/14 362/520 |
| 2017/0291353 A1* | 10/2017 | Sagesaka ............ B29C 65/1635 |
| 2019/0338928 A1* | 11/2019 | Wasilewski ........... F21S 43/245 |

FOREIGN PATENT DOCUMENTS

JP    2019-055624 A    4/2019

OTHER PUBLICATIONS

International Search Report (ISR) (PCT Form PCT/ISA/210), in PCT/JP2020/020078, dated Jul. 28, 2020.

\* cited by examiner

*Primary Examiner* — Elmito Breval
(74) *Attorney, Agent, or Firm* — McGinn I.P. Law Group, PLLC

(57) ABSTRACT

In order to ensure accuracy for positioning two molding members spaced from each other and an outer lens disposed in an opening between the two molding members, a vehicle lighting device includes: a first molding member; a second molding member that is formed separately from the first molding member and is spaced from the first molding member through an opening; and an outer lens, disposed in the opening, having a transmissive surface through which lamp light is transmitted from a depth side toward a front side. The first molding member and the second molding member each have a molding-side positioning portion configured to be positioned relative to the transmissive surface of the outer lens. The outer lens has a first lens-side positioning portion configured to be positioned relative to (Continued)

the first molding member and a second lens-side positioning portion configured to be positioned relative to the second molding member.

7 Claims, 5 Drawing Sheets

VEHICLE LIGHTING DEVICE

TECHNICAL FIELD

The present invention relates to a vehicle lighting device mounted to a vehicle.

BACKGROUND ART

To date, a vehicle lighting device mounted to a vehicle has been known (for example, Patent Literature 1). The vehicle lighting device includes a light emitter. The light emitter is disposed at the back side of a bumper, a grille, or the like in a front portion of the vehicle or in a rear portion of the vehicle. The bumper or the grille has a decorative member. The decorative member is formed of two molding members separated in the up-down direction. The above-described light emitter is disposed at the back side of an opening that is a gap between the upper molding member and the lower molding member. Light from the light emitter is emitted outwardly of the vehicle through the opening.

CITATION LIST

Patent Literature

Patent Literature 1: JP2019-055624A

SUMMARY OF INVENTION

Technical Problem

In the structure of the vehicle lighting device as disclosed in Patent Literature 1 in which an opening is formed between the two molding members separated from each other, and an outer lens that transmits therethrough light from the light emitter is disposed in the opening, unless the outer lens and each of the molding members are fixed to each other, an accuracy for positioning the outer lens and each of the molding members becomes low, and a gap is likely to be generated between the outer lens and the molding members or an abnormal sound is likely to be generated due to vibration of the vehicle or the like.

The present invention has been made in view of such circumstances, and an object of the present invention is to provide a vehicle lighting device for which an accuracy for positioning two molding members separated from each other and an outer lens disposed in an opening between the two molding members is ensured.

Solution to Problem

One aspect of the present invention is directed to a vehicle lighting device including: a first molding member; a second molding member that is formed separately from the first molding member and is spaced from the first molding member through an opening; and an outer lens disposed in the opening, the outer lens having a transmissive surface through which lamp light is transmitted from a depth side toward a front side. The first molding member and the second molding member each have a molding-side positioning portion configured to be positioned relative to the transmissive surface of the outer lens. The outer lens has a first lens-side positioning portion configured to be positioned relative to the first molding member and a second lens-side positioning portion configured to be positioned relative to the second molding member.

In this configuration, the first molding member is positioned directly with respect to the transmissive surface of the outer lens, and the second molding member spaced from the first molding member is positioned directly with respect to the transmissive surface of the outer lens, so that an accuracy for positioning the transmissive surface of the outer lens, and the first molding member and the second molding member is ensured.

DESCRIPTION OF EMBODIMENTS

An embodiment of a vehicle lighting device according to the present invention is specifically described below with reference to the drawings.

1. Structure of Vehicle Lighting Device

A vehicle lighting device 1 according to one embodiment is a lighting device mounted to a vehicle. The vehicle lighting device 1 is disposed on an outer surface of a vehicle body or an inner surface of a vehicle compartment. In the following description, the vehicle lighting device 1 is disposed on the outer surface of the vehicle body, and emits light outwardly of the vehicle. For example, the vehicle lighting device 1 is mounted to a front bumper or a front grille of the vehicle, or the like.

Figure 1:
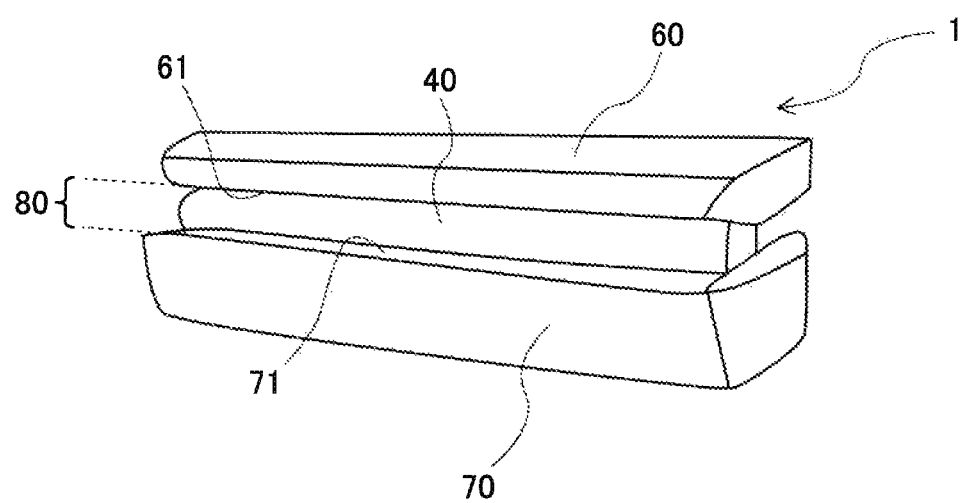
FIG. 1 is a perspective view of an outer appearance of a vehicle lighting device according to one embodiment of the present invention.
Figure 2:
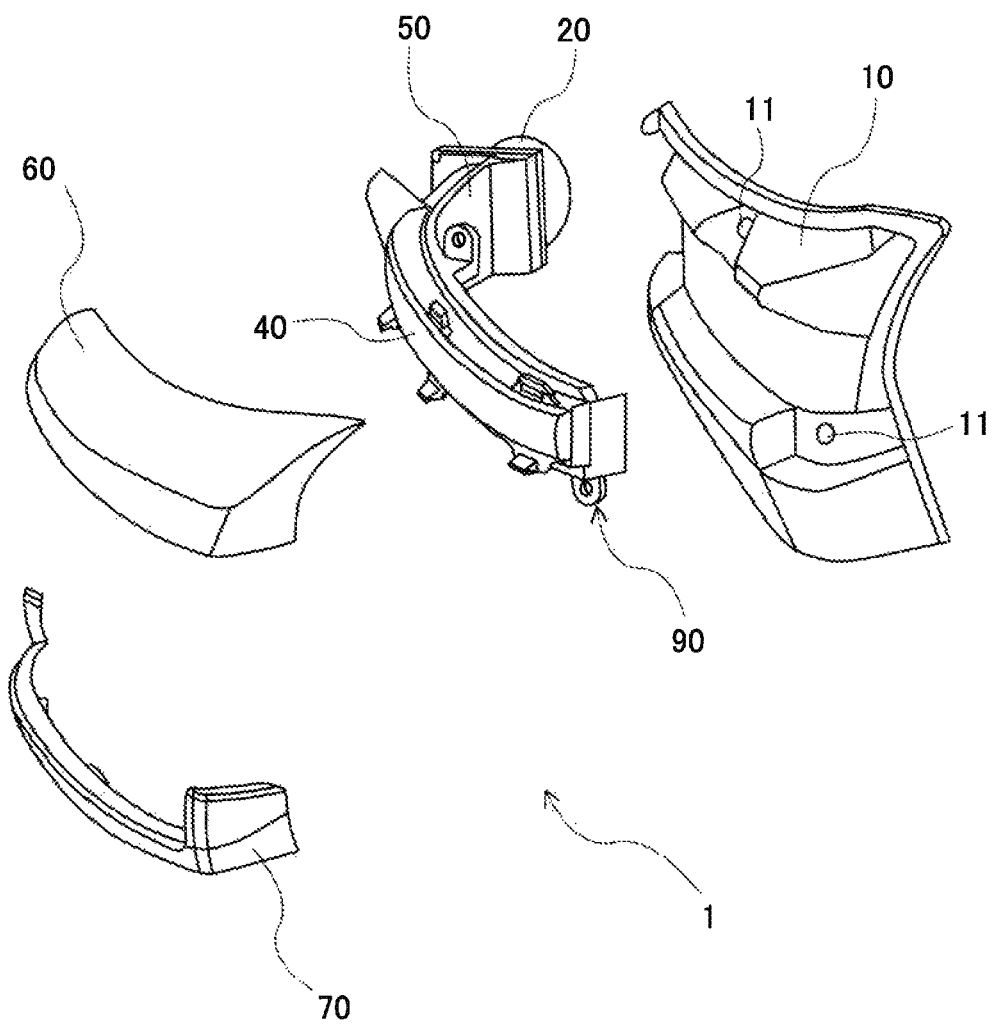
FIG. 2 is an exploded perspective view of the vehicle lighting device according to the embodiment.
Figure 3:
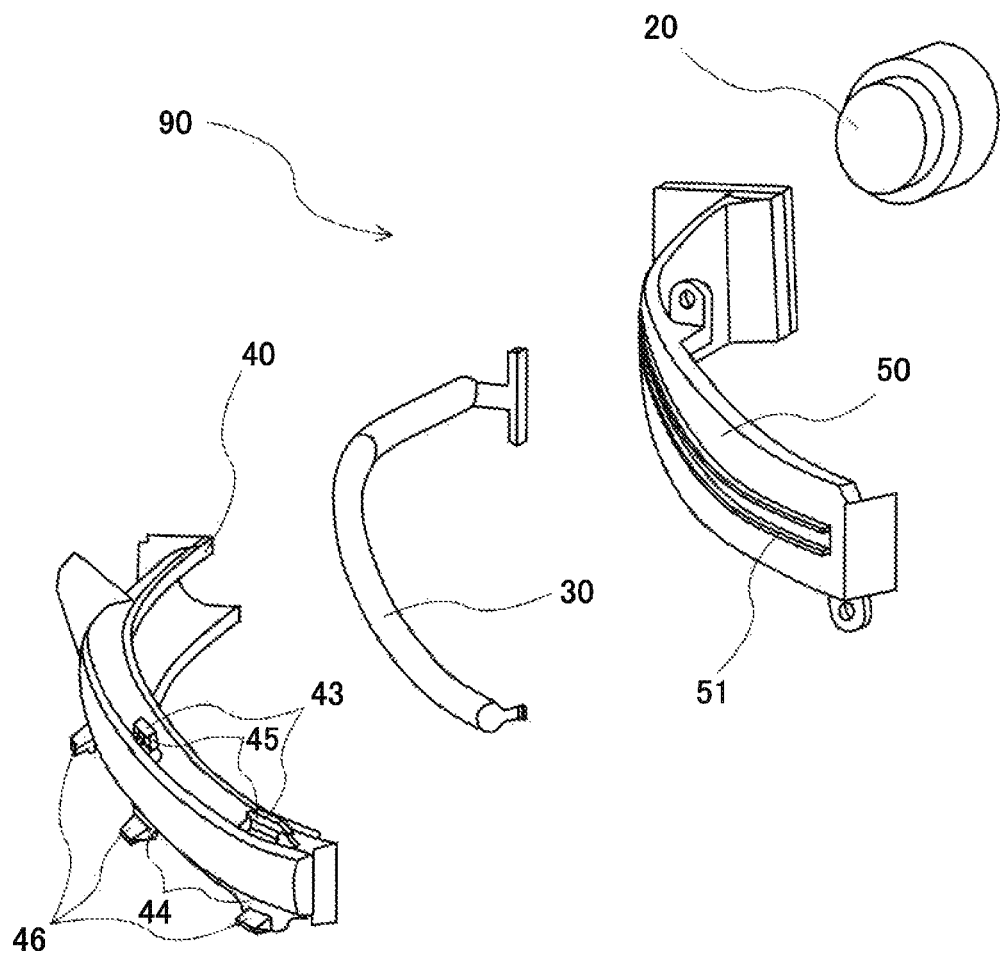
FIG. 3 is an exploded perspective view of a lamp assembly of the vehicle lighting device according to the embodiment.

The vehicle lighting device 1 includes a bracket 10, a light source 20, an inner lens 30, an outer lens 40, a lamp housing 50, a first molding member 60, and a second molding member 70, as shown in FIG. 1, FIG. 2, and FIG. 3.

The bracket 10 is a member disposed at the vehicle body. The bracket 10 is plate-shaped. The bracket 10 is a support member to which the lamp housing 50, the first molding member 60, and the second molding member 70 are attached. The bracket 10 has attachment portions 11 for attaching the lamp housing 50, the first molding member 60, and the second molding member 70. The lamp housing 50, the first molding member 60, and the second molding member 70 are attached to the attachment portions 11 of the bracket 10 by, for example, screwing or claw-fitting.

The light source 20 is implemented as a light emitter such as an LED emitting visible light. The light source 20 emits, for example, light having various colors. The light source 20 is connected to a control unit (not shown), and is controlled to emit light by the control unit.

The inner lens 30 is a light guide which light emitted from the light source 20 enters. One end of the inner lens 30 is connected to the light source 20. The inner lens 30 horizontally extends. The inner lens 30 may horizontally extend so as to be curved according to curving of the front bumper or the grille. The inner lens 30 is formed so as to have a substantially round cross-section. Light entering the inner lens 30 from the light source 20 is emitted substantially uniformly to the outer surface of the inner lens 30.

The outer lens 40 is a lens for emitting light (hereinafter, referred to as lamp light as appropriate) from the inner lens 30 outwardly of the vehicle. The outer lens 40 is formed so as to have a U-shaped cross-section or a semicircular cross-section such that the inner lens 30 is covered. A part (specifically, an end portion on the vehicle body outer side) of the outer lens 40 is formed so as to be disposed on the vehicle body outer side with respect to the inner lens 30. The outer lens 40 horizontally extends. The outer lens 40 may horizontally extend so as to be curved according to curving of the inner lens 30.

Figure 4:
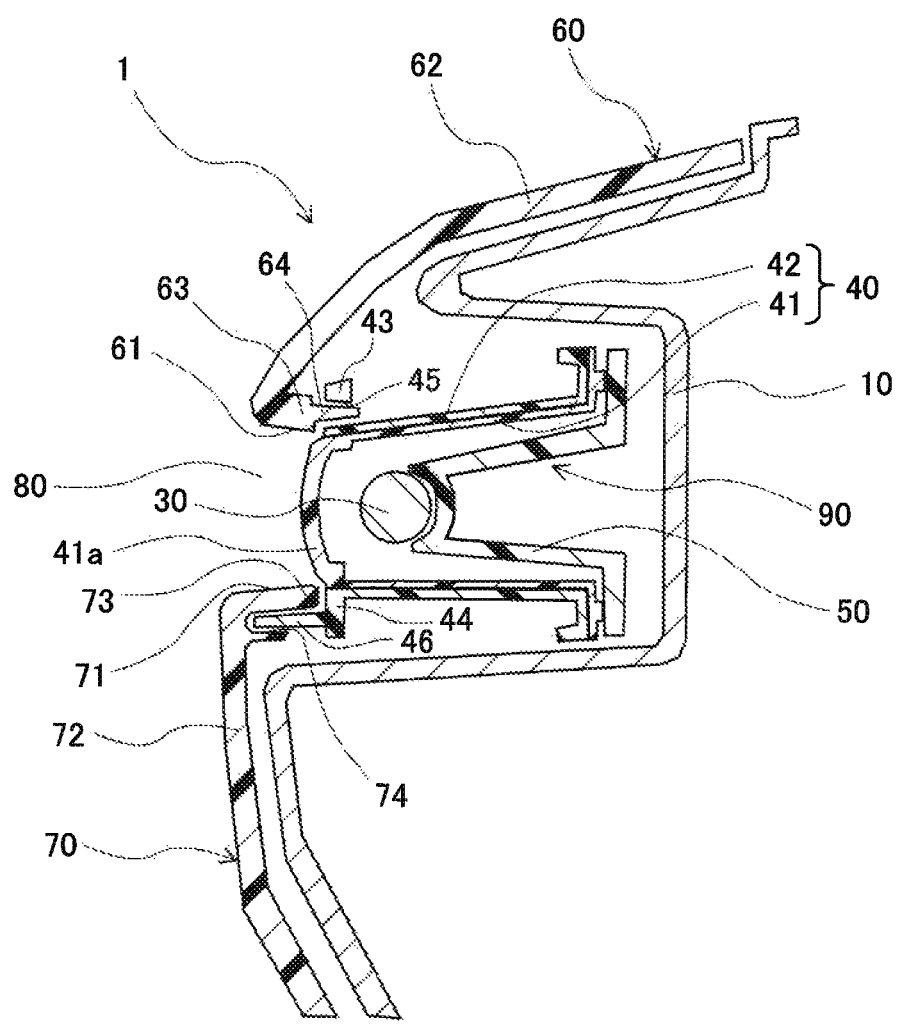
FIG. 4 is a cross-sectional view of a main portion of the vehicle lighting device according to the embodiment.

The outer lens 40 includes a transparent portion 41 and a non-transparent portion 42, as shown in FIG. 4. The transparent portion 41 transmits therethrough lamp light from the inner lens 30. The transparent portion 41 is formed so as to cover the inner lens 30. The transparent portion 41 includes a transmissive surface 41a that transmits lamp light from the inner lens 30 on the inner side (depth side) of the vehicle compartment, toward the vehicle body outer side (front side), through an opening 80 described below. The inner lens 30 is disposed at the back side (that is, the inner side of the vehicle compartment) of the transmissive surface 41a of the outer lens 40.

The non-transparent portion 42 blocks lamp light. The non-transparent portion 42 is, for example, colored black. The non-transparent portion 42 is formed so as to cover a part of the transparent portion 41. The non-transparent portion 42 is provided so as to prevent lamp light from leaking outwardly from a portion other than the transmissive surface 41a. The non-transparent portion 42 is formed at a portion other than the transmissive surface 41a in the entirety of the outer lens 40. The transparent portion 41 and the non-transparent portion 42 of the outer lens 40 are formed by two-color molding.

Instead of the two-color molding, the outer lens 40 may be formed by coating the non-transparent portion 42 on a front surface or a back surface of a part of a transparent body of the outer lens 40. The outer lens 40 may be formed by combining the transparent portion 41 and the non-transparent portion 42 which are formed as separate portions.

The lamp housing 50 is a support member to which the light source 20, the inner lens 30, and the outer lens 40 are attached. The lamp housing 50 is a plate-shaped member that horizontally extends. The lamp housing 50 may horizontally extend so as to be curved according to curving of the inner lens 30 and the outer lens 40. The lamp housing 50 includes an attachment portion 51 for attaching the light source 20, the inner lens 30, and the outer lens 40. The light source 20, the inner lens 30, and the outer lens 40 are attached to the attachment portion 51 of the lamp housing 50 by, for example, screwing, claw-fitting, vibration welding, or thermal welding. The light source 20, the inner lens 30, and the outer lens 40 are attached to the lamp housing 50 to form a lamp assembly 90.

The first molding member 60 and the second molding member 70 are each a decorative member having a decorative portion on an exposed surface. The first molding member 60 and the second molding member 70 are each plated molding obtained by, for example, plating a surface of synthetic resin such as ABS resin. The first molding member 60 and the second molding member 70 are each formed so as to have a predetermined size and a predetermined shape from the viewpoint of arrangement with peripheral members and decorative purpose for the outer surface of the vehicle body. The first molding member 60 and the second molding member 70 may be each formed so as to have an elongated shape. The first molding member 60 is disposed at an upper portion of the outer surface of the vehicle body. The second molding member 70 is disposed at a lower portion of the outer surface of the vehicle body.

The first molding member 60 and the second molding member 70 are formed as separate bodies, and are spaced from each other in the up-down direction of the vehicle. The first molding member 60 and the second molding member 70 may be combinable with each other and have respective portions that come into contact with each other. The first molding member 60 has a horizontal edge portion 61 that horizontally extends at the lower end. The second molding member 70 has a horizontal edge portion 71 that horizontally extends at the upper end. An opening 80 that is opened in the front-rear direction of the vehicle is formed between the horizontal edge portion 61 of the first molding member 60 and the horizontal edge portion 71 of the second molding member 70. That is, the first molding member 60 and the second molding member 70 are spaced from each other through the opening 80. The opening 80 horizontally extends.

The outer lens 40 described above is disposed in the opening 80. Specifically, the transparent portion 41 (specifically, the transmissive surface 41a) of the outer lens 40 is disposed in the opening 80. Therefore, lamp light from the inner lens 30 is emitted outwardly of the vehicle through the transmissive surface 41a of the outer lens 40 and the opening 80.

The first molding member 60 has a molding body portion 62 and a protrusion 63. The molding body portion 62 is a plate-shaped portion exposed at the outer surface of the vehicle body. The molding body portion 62 horizontally extends. The protrusion 63 protrudes from the back surface of the molding body portion 62 toward the inner side (depth side) of the vehicle compartment. The protrusion 63 protrudes horizontally from the end portion of the molding body portion 62 on the opening 80 side, that is, from the horizontal edge portion 61. A plurality of the protrusions 63 are disposed so as to be spaced from each other in the longitudinal direction of the molding body portion 62. In the first molding member 60, at least the surface of the molding body portion 62 on the outer surface side of the vehicle body and the surface of the protrusion 63 on the opening 80 side are plated.

The first molding member 60 has a first molding-side positioning portion 64. The first molding-side positioning portion 64 is a portion for positioning the first molding member 60 and the outer lens 40, and is specifically a portion positioned relative to the transmissive surface 41a of the outer lens 40. The first molding-side positioning portion 64 is disposed at the front end portion of the protrusion 63 on the inner side (depth side) of the vehicle compartment. The first molding-side positioning portion 64 is a protrusion that is inserted in and engaged with a first lens-side positioning portion, described below, of the outer lens 40. The first molding-side positioning portion 64 is tapered so as to reduce a width from the back surface side of the molding body portion 62 toward the depth side.

The second molding member 70 has a molding body portion 72 and a protrusion 73. The molding body portion 72 is a plate-shaped portion exposed at the outer surface of the vehicle body. The molding body portion 72 has a horizontally extending portion. The protrusion 73 protrudes from the back surface of the molding body portion 72 toward the inner side (depth side) of the vehicle compartment. The protrusion 73 protrudes horizontally from the end portion of the molding body portion 72 on the opening 80 side, that is, from the horizontal edge portion 71. A plurality of the protrusions 73 are disposed so as to be spaced from each other in the longitudinal direction of the molding body portion 72. In the second molding member 70, at least the surface of the molding body portion 72 on the outer surface side of the vehicle body and the surface of the protrusion 73 on the opening 80 side are plated.

The second molding member 70 has a second molding-side positioning portion 74. The second molding-side positioning portion 74 is a portion for positioning the second molding member 70 and the outer lens 40, and is specifically a portion positioned relative to the transmissive surface 41a of the outer lens 40. The second molding-side positioning portion 74 is disposed on the back surface side opposite to the surface of the protrusion 73 on the opening 80 side. The second molding-side positioning portion 74 is a hole in and with which a second lens-side positioning portion, described below, of the outer lens 40 is inserted and engaged.

The above-described outer lens 40 has an upper flange portion 43 and a lower flange portion 44. The upper flange portion 43 and the lower flange portion 44 are both disposed at the non-transparent portion 42. The upper flange portion 43 protrudes from the outer edge of the transmissive surface 41a of the transparent portion 41 in the upward direction (that is, a direction away from the opening 80). The lower flange portion 44 protrudes from the outer edge of the transmissive surface 41a in the downward direction (that is, a direction away from the opening 80). The upper flange portion 43 and the lower flange portion 44 are both formed so as to be coplanar with the transmissive surface 41a.

The upper flange portion 43 and the lower flange portion 44 each have a surface extending along the longitudinal direction of the outer lens 40. A plurality of the upper flange portions 43 are disposed so as to be spaced from each other in the longitudinal direction of the outer lens 40 at the upper edge of the transmissive surface 41a of the transparent portion 41. A plurality of the lower flange portions 44 are disposed so as to be spaced from each other in the longitudinal direction of the outer lens 40 at the lower edge of the transmissive surface 41a of the transparent portion 41.

The outer lens 40 has a first lens-side positioning portion 45 and a second lens-side positioning portion 46, The first lens-side positioning portion 45 is a portion for positioning the outer lens 40 and the first molding member 60, and is specifically a portion positioned relative to the first molding member 60. The first lens-side positioning portion 45 is disposed at the upper flange portion 43 and disposed at the non-transparent portion 42. The first lens-side positioning portion 45 is a hole formed in the upper flange portion 43, and penetrates in a direction in which the first molding-side positioning portion 64 of the first molding member 60 is inserted. The first lens-side positioning portion 45 and the first molding-side positioning portion 64 of the first molding member 60 are positioned relative to each other by a recess-protrusion interlocking structure.

The first molding-side positioning portion 64 of the first molding member 60 and the first lens-side positioning portion 45 of the outer lens 40 are engaged with each other and positioned relative to each other, whereby the first molding member 60 is prevented from moving and rotating relative to the outer lens 40 in the direction in which the first molding-side positioning portion 64 is inserted, the up-down direction of the vehicle, and the left-right direction of the vehicle.

The second lens-side positioning portion 46 is a portion for positioning the outer lens 40 and the second molding member 70, and is specifically a portion positioned relative to the second molding member 70. The second lens-side positioning portion 46 is disposed at the lower flange portion 44 and disposed at the non-transparent portion 42. The second lens-side positioning portion 46 is a protrusion formed on the vehicle body outer surface side of the lower flange portion 44, and protrudes horizontally in the insertion direction of the second molding-side positioning portion of the second molding member 70. The second lens-side positioning portion 46 is tapered so as to narrow a width from the vehicle body outer surface side of the lower flange portion 44 toward the front side. The second lens-side positioning portion 46 and the second molding-side positioning portion 74 of the second molding member 70 are positioned relative to each other by a recess-protrusion interlocking structure.

The second molding-side positioning portion 74 of the second molding member 70 and the second lens-side positioning portion 46 of the outer lens 40 are engaged with each other and positioned relative to each other, whereby the second molding member 70 is prevented from moving and rotating relative to the outer lens 40 in the insertion direction of the second molding-side positioning portion 74, the up-down direction of the vehicle, and the left-right direction of the vehicle.

2. Assembly of Vehicle Lighting Device

The vehicle lighting device 1 is assembled in the following procedure. Firstly, the light source 20, the inner lens 30, the outer lens 40, and the lamp housing 50 for forming the lamp assembly 90 are prepared. The light source 20, the inner lens 30, and the outer lens 40 are attached to the attachment portion 51 of the lamp housing 50 to form the lamp assembly 90.

Subsequently, the lamp assembly 90, the first molding member 60, the second molding member 70, and the bracket 10 are prepared. The lamp assembly 90, the first molding member 60, and the second molding member 70 are attached to the attachment portions 11 of the bracket 10. Specifically, the first molding-side positioning portion 64 of the first molding member 60 is firstly inserted in the first lens-side positioning portion 45 of the outer lens 40 of the lamp assembly 90, whereby both the positioning portions 45 and 64 are engaged with each other to perform positioning, and the second lens-side positioning portion 46 of the outer lens 40 is inserted in the second molding-side positioning portion 74 of the second molding member 70, whereby both the positioning portions 46 and 74 are engaged with each other to perform positioning. The lamp assembly 90, the first molding member 60, and the second molding member 70 which are positioned, are positioned relative to the bracket 10 and screwed. Therefore, the lamp assembly 90 or the like is prevented from falling from the bracket 10.

The lamp assembly 90, the first molding member 60, and the second molding member 70 have been attached to the bracket 10, whereby the opening 80 is formed between the horizontal edge portion 61 of the first molding member 60 and the horizontal edge portion 71 of the second molding member 70, and the transmissive surface 41a of the outer lens 40 is disposed in the opening 80. When the light source 20 emits light in this state, lamp light is emitted through the inner lens 30, and the lamp light is emitted outwardly of the vehicle through the transmissive surface 41a of the outer lens 40 and the opening 80. Therefore, a person outside the vehicle is allowed to view the lamp light emitted through the opening 80 between the first molding member 60 and the second molding member 70 of the vehicle.

3. Effect of Vehicle Lighting Device

In the vehicle lighting device 1, after the above-described assembly, the outer lens 40 of the lamp assembly 90 and the first molding member 60 are fixed to each other in the relatively positioned state and the outer lens 40 and the second molding member 70 are fixed to each other in the relatively positioned state.

Particularly, the outer lens 40 and the first molding member 60 are positioned relative to each other as described above between the first lens-side positioning portion 45 of the upper flange portion 43 formed on the upper edge of the transmissive surface 41a of the outer lens 40, and the first molding-side positioning portion 64 of the protrusion 63 protruding toward the depth side from the back surface of the end portion, on the opening 80 side, of the molding body portion 62 of the first molding member 60. Furthermore, the outer lens 40 and the second molding member 70 are positioned relative each other between the second lens-side positioning portion 46 of the lower flange portion 44 formed on the lower edge of the transmissive surface 41a of the outer lens 40, and the second molding-side positioning portion 74 of the protrusion 73 protruding toward the depth side from the back surface of the end portion, on the opening 80 side, of the molding body portion 72 of the second molding member 70.

Accordingly, the first molding member 60 is positioned relative to the transmissive surface 41a near the transmissive surface 41a of the outer lens 40, and the second molding member 70 is positioned relative to the transmissive surface 41a near the transmissive surface 41a of the outer lens 40, whereby an accuracy for positioning the transmissive surface 41a of the outer lens 40, and the first molding member 60 and the second molding member 70 is ensured and misalignment after the assembly is prevented.

Therefore, generation of an abnormal sound, generation of a gap between the outer lens 40 and the first molding member 60, and generation of a gap between the outer lens 40 and the second molding member 70 due to vibration of the vehicle or the like are inhibited. A reflector effect at the first molding member 60 and the second molding member 70 is stabilized, and decorativeness at the outer surface of the vehicle body is thus enhanced.

Each of the first molding member 60 and the second molding member 70 is plated molding that is formed in a plate-like shape and exposed at the outer surface of the vehicle body. Particularly, at least the surfaces of the molding body portions 62 and 72 on the vehicle body outer surface side and the surfaces of the protrusions 63 and 73 on the opening 80 side are plated in the first molding member 60 and the second molding member 70. The first molding-side positioning portion 64 is disposed at the front end portion of the protrusion 63 on the depth side. The second molding-side positioning portion 74 is disposed on the back surface side opposite to the surface of the protrusion 73 on the opening 80 side.

In this structure, the plated surfaces of the protrusions 63 and 73 on the opening 80 side are exposed at the first molding member 60 and the second molding member 70 in front of the transmissive surface 41a of the outer lens 40. Therefore, a reflector effect is enhanced near the opening 80 in front of the transmissive surface 41a of the outer lens 40, whereby decorativeness at the edge portion of the opening 80 is enhanced.

The outer lens 40 includes the transparent portion 41 including the transmissive surface 41a through which lamp light is transmitted, and the non-transparent portion 42 that blocks lamp light. The first lens-side positioning portion 45 and the second lens-side positioning portion 46 are disposed at the non-transparent portion 42. Therefore, unlike in a structure in which the lens-side positioning portions 45 and 46 of the outer lens 40 are disposed at the transparent portion 41, the lens-side positioning portions 45 and 46 are prevented from being easily viewed by a person outside the vehicle.

A material of the transparent portion 41 through which lamp light is transmitted is more restrictive than a material of the non-transparent portion 42 that blocks lamp light. That is, the material of the non-transparent portion 42 is selectable from multiple materials as compared with the material of the transparent portion 41. Therefore, a range of materials selectable for the non-transparent portion 42 at which the first lens-side positioning portion 45 and the second lens-side positioning portion 46 of the outer lens 40 are disposed, is increased, whereby the strength of each of the lens-side positioning portions 45 and 46 is enhanced.

The non-transparent portion 42 described above is formed so as to cover the transparent portion 41 at the surface of the transparent portion 41 on the inner side of the vehicle compartment, and lamp light from the inner lens 30 is prevented from leaking outwardly from a portion other than the transmissive surface 41a. Therefore, lamp light from the inner lens 30 is prevented from leaking through a portion (for example, a gap between the first molding member 60 and the bracket 10 or a gap between the second molding member 70 and the bracket 10) other than the transmissive surface 41a of the outer lens 40.

In the above-described embodiment, the first molding-side positioning portion 64 and the second molding-side positioning portion 74 correspond to "molding-side positioning portion" in the claims, and the upper flange portion 43 and the lower flange portion 44 correspond to "flange portion" in the claims.

In the above-described embodiment, the vehicle lighting device 1 is applied to a front bumper or a front grille at which a front lamp or a front fog lamp of a vehicle is disposed. However, the present invention is not limited thereto. The vehicle lighting device 1 is also applied to, for example, a rear bumper at which a rear lamp or a rear fog lamp of a vehicle is disposed or a vehicle body side surface at which molding is disposed.

In the above-described embodiment, the first molding member 60 and the second molding member 70 are spaced from each other through the opening 80, and the opening 80 is formed between the horizontal edge portion 61 of the first molding member 60 and the horizontal edge portion 71 of the second molding member 70. In this case, the opening 80 linearly extends horizontally. However, the present invention is not limited thereto. The opening 80 formed between the first molding member 60 and the second molding member 70 may extend so as to be curved.

In the above-described embodiment, the outer lens 40 is formed of the transparent portion 41 that transmits therethrough lamp light, and the non-transparent portion 42 that blocks lamp light. However, the present invention is not limited thereto. The outer lens 40 may be merely formed of the transparent portion 41 without having the non-transparent portion 42.

In the above-described embodiment, the first lens-side positioning portion 45 of the outer lens 40 and the first molding-side positioning portion 64 of the first molding member 60 are positioned relative to each other by a recess-protrusion interlocking structure, and the second lens-side positioning portion 46 of the outer lens 40 and the second molding-side positioning portion 74 of the second molding member 70 are positioned relative to each other by a recess-protrusion interlocking structure. However, the present invention is not limited thereto. These positioning may be performed by fitting claws to each other.

In the above-described embodiment, after the lamp assembly 90 and the first molding member 60 are positioned relative to each other and the lamp assembly 90 and the second molding member 70 are positioned relative to each other, the lamp assembly 90, the first molding member 60, and the second molding member 70 are aligned with the bracket 10 and screwed. However, the present invention is not limited thereto. After the lamp assembly 90 is aligned with the bracket 10, the lamp assembly 90 and the first molding member 60 may be positioned relative to each other and the lamp assembly 90 and the second molding member 70 may be positioned relative to each other, and screwed.

Figure 5:
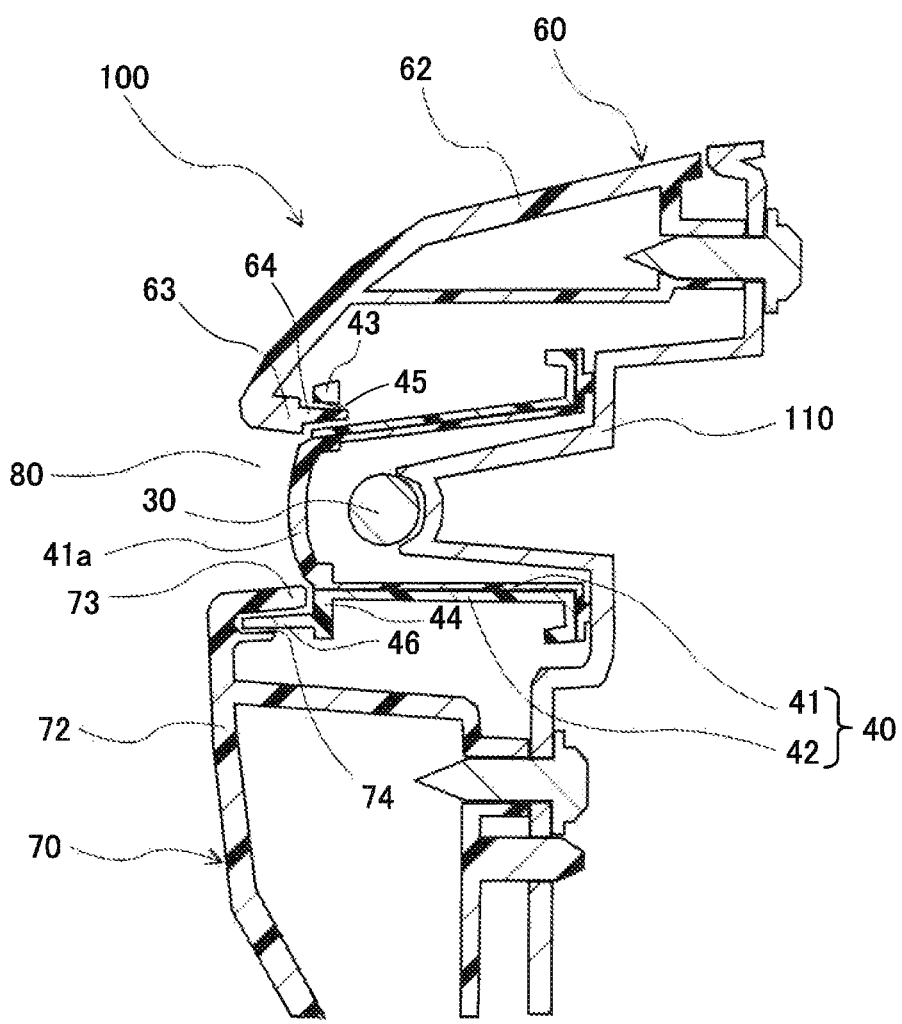
FIG. 5 is a cross-sectional view of a main portion of a vehicle lighting device according to a modification of the present invention.

Furthermore, in the above-described embodiment, in the vehicle lighting device 1, the lamp housing 50 for supporting the inner lens 30 and the outer lens 40, and the bracket 10 to which the lamp assembly 90 having the inner lens 30 and the outer lens 40 attached to the lamp housing 50, the first molding member 60, and the second molding member 70 are attached, are formed as separate bodies. However, the present invention is not limited thereto. As shown in FIG. 5, a vehicle lighting device 100 having a bracket 110 that doubles as a lamp housing to which the inner lens 30 and the outer lens 40 are attached, and a bracket to which the first molding member 60 and the second molding member 70 are attached, by integrating the lamp housing and the bracket with each other, may be provided.

The present invention is not limited to the above-described embodiments and modifications, and may be modified in various ways without departing from the gist of the present invention.

The present application claims priority from Japanese patent application No. 2019-150736 filed on Aug. 20, 2019, the entire content of which is hereby incorporated by reference into the present application.

DESCRIPTION OF THE REFERENCE CHARACTERS 1, 100: vehicle lighting device
10, 110: bracket
20: light source
30: inner lens
40: outer lens
41: transparent portion
41a: transmissive surface
42: non-transparent portion
43: upper flange portion
44: lower flange portion
45: first lens-side positioning portion
46: second lens-side positioning portion
50: lamp housing
60: first molding member
61: horizontal edge portion
62: molding body portion
63: protrusion
64: first molding-side positioning portion
70: second molding member
71: horizontal edge portion
72: molding body portion
73: protrusion
74: second molding-side positioning portion
80: opening
90: lamp assembly

The invention claimed is:

1. A vehicle lighting device comprising:
a first molding member;
a second molding member that is formed separately from the first molding member and is spaced from the first molding member through an opening; and
an outer lens disposed in the opening, the outer lens having a transmissive surface through which lamp light is transmitted from a depth side toward a front side, wherein
the first molding member and the second molding member each have a molding-side positioning portion configured to be positioned relative to the transmissive surface of the outer lens, and
the outer lens has a first lens-side positioning portion configured to be positioned relative to the first molding member and a second lens-side positioning portion configured to be positioned relative to the second molding member.

2. The vehicle lighting device according to claim 1, wherein
the first molding member and the second molding member each have a plate-shaped molding body portion that is exposed, and a protrusion protruding from an edge portion of the molding body portion on the opening side toward the depth side, and
the molding-side positioning portion is disposed at a front end portion of the protrusion or on a back surface side opposite to a surface of the protrusion on the opening side.

3. The vehicle lighting device according to claim 2, wherein a surface of the molding body portion and the surface of the protrusion on the opening side are plated.

4. The vehicle lighting device according to claim 1, wherein
the outer lens has a flange portion protruding from an outer edge of the transmissive surface in a direction away from the opening, and
the first lens-side positioning portion and the second lens-side positioning portion are disposed at the flange portion.

5. The vehicle lighting device according to claim 1, wherein
the outer lens includes a transparent portion including the transmissive surface, and a non-transparent portion that blocks the lamp light, and
the first lens-side positioning portion and the second lens-side positioning portion are disposed at the non-transparent portion.

6. The vehicle lighting device according to claim 1, wherein
the molding-side positioning portion of the first molding member and the first lens-side positioning portion of the outer lens are positioned relative to each other by a recess-protrusion interlocking structure, and
the molding-side positioning portion of the second molding member and the second lens-side positioning portion of the outer lens are positioned relative to each other by a recess-protrusion interlocking structure.

7. The vehicle lighting device according to claim 1, comprising
a lamp housing to which the outer lens and a light source for emitting the lamp light are attached; and a bracket to which the first molding member, the second molding member, and the lamp housing are attached, the bracket disposed at a vehicle body.

\* \* \* \* \*